April 1, 1947.  W. G. HOWARD  2,418,409
EGG TREATING MACHINE
Filed June 28, 1944   3 Sheets-Sheet 1
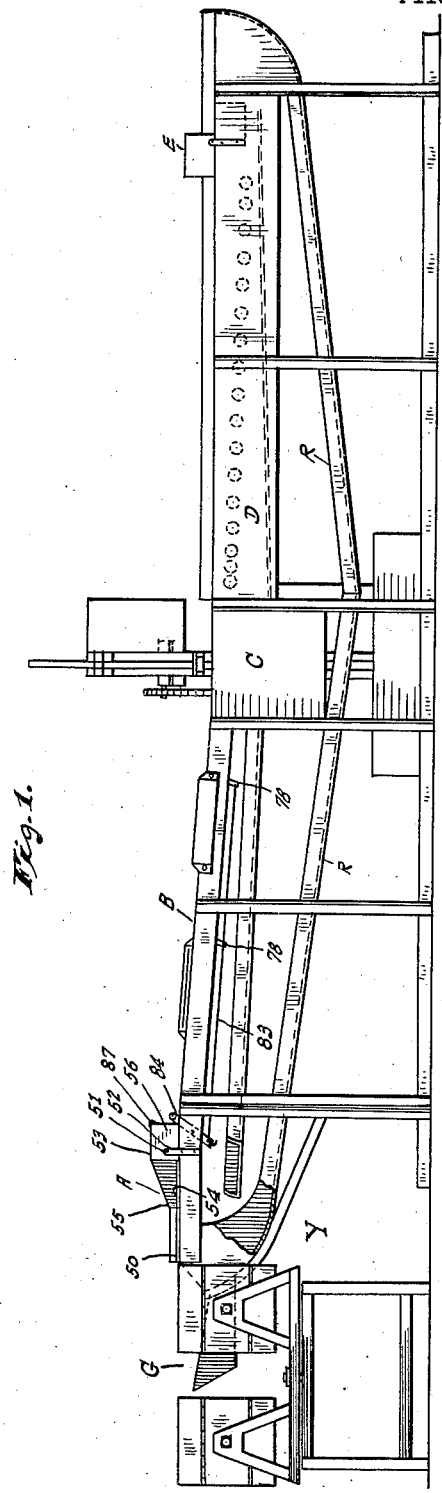
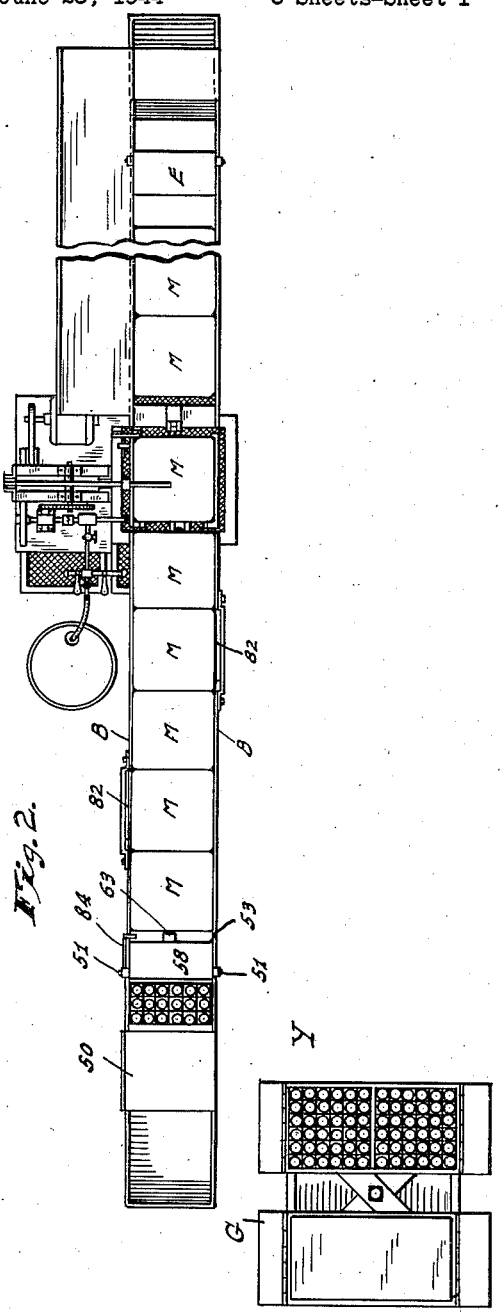
INVENTOR.
WILLIS G. HOWARD,
BY
Hood & Hahn
ATTORNEYS.

April 1, 1947.   W. G. HOWARD   2,418,409
EGG TREATING MACHINE
Filed June 28, 1944   3 Sheets-Sheet 2
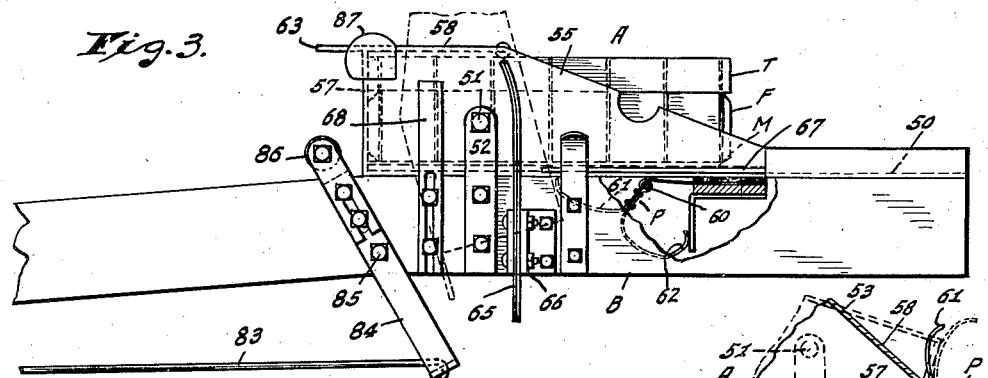
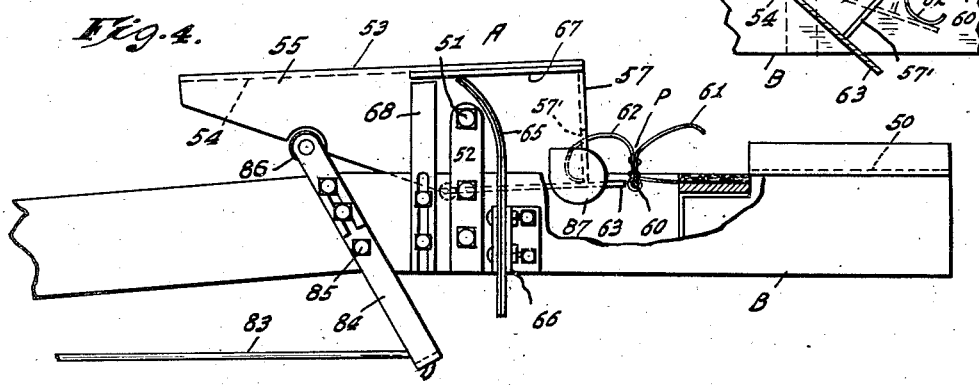
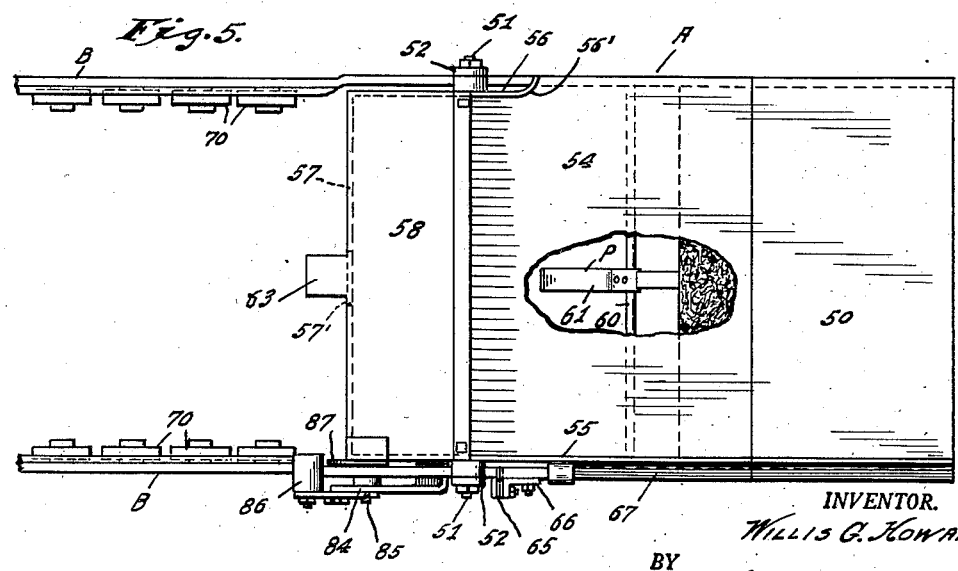
INVENTOR.
WILLIS G. HOWARD,
BY
Hood & Hahn
ATTORNEYS.

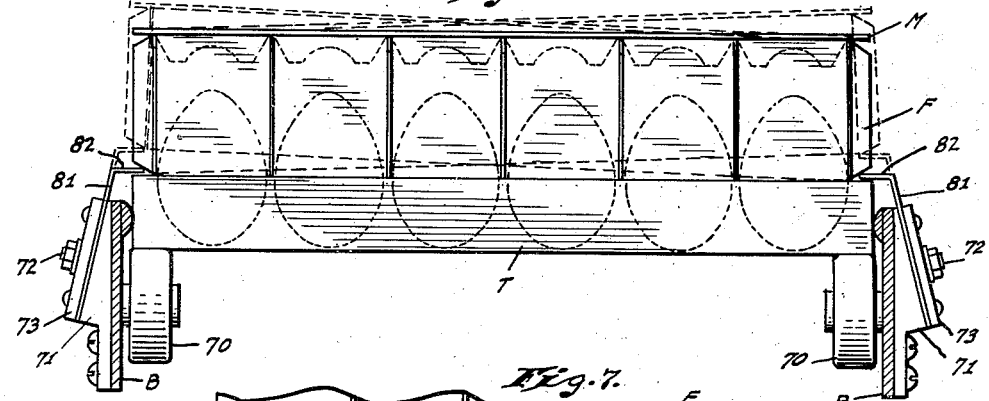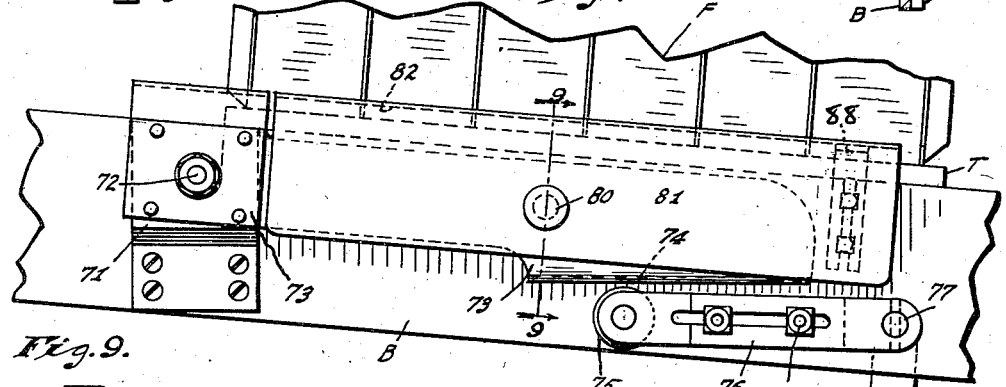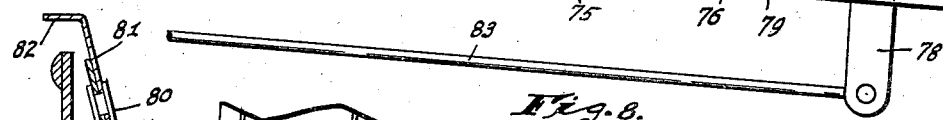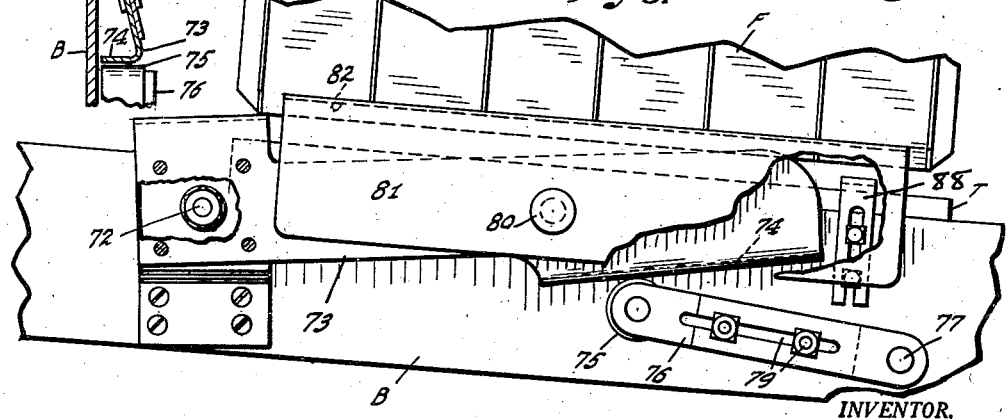

Patented Apr. 1, 1947

2,418,409

UNITED STATES PATENT OFFICE 2,418,409

EGG TREATING MACHINE

Willis G. Howard, Indianapolis, Ind.

Application June 28, 1944, Serial No. 542,584

11 Claims. (Cl. 226—14)

It has long been well known that by immersing fresh eggs, such as hen eggs, in a heated bath of suitable oil, deterioration of the eggs may be inhibited for a considerable period, and various mechanisms have been provided for accomplishing the desired treatment, such, for instance, as the mechanisms shown in my Patents 1,862,508; 1,960,339 and 1,988,795; and Patent 1,883,669 to B. E. Ford.

Eggs arrive at a treating plant packed in boxes or crates in groups of three dozen supported by a pocketed base mat and separated by a so-called "filler," a collapsible structure of two series of parallel walls or partitions, one series being positionable at right angles to the other series to form thirty-six cells, one for each of the thirty-six eggs of a group.

In mechanisms of the above-mentioned type, cellular metal trays are provided for receiving egg groups and carrying them to, through, and from, the immersing bath, and it is necessary to transfer the egg groups from the shipping crates to such trays, to separate the fillers and base mats, to reassemble the fillers and base mats with the treated eggs, and to remove the cellular trays.

The cost of such handling and preservative treatment of the eggs must, of course, be included in the consumer price of the eggs and it is therefore highly important that said treatment cost shall be as low as possible.

The object of my present invention is to provide improved means by which groups of eggs may be quickly and safely transferred from the fillers to carrying trays and for manipulating the fillers so that while they may proceed with the trays and inverted eggs to a discharge station, the eggs and treatment trays may be separated from and returned to the fillers at an intermediate immersion station.

The accompanying drawings illustrate an embodiment of my invention.

Fig. 1 is a side elevation of apparatus embodying my invention;

Fig. 2 is a plan of the parts shown in Fig. 1;

Fig. 3 is a side elevation of the egg-group transfer means in receiving position;

Fig. 3a is a fragmentary section of parts shown in Fig. 3 and illustrating an intermediate position of the ejector.

Fig. 4 is a side elevation, like Fig. 3, with the transfer means in delivery position;

Fig. 5 is a plan with the transfer pan in receiving position;

Fig. 6 is a section, on a larger scale, transversely through runway B just to the left of tank C of Fig. 1;

Fig. 7 is a side elevation of the parts shown in Fig. 6;

Fig. 8 is a view, like Fig. 7, with the filler lifting lever in raised position; and Fig. 9 is a section on line 9—9 of Fig. 7.

In the drawings A indicates an egg-group transfer means, B a runway inclined downwardly to an immersion tank C from which leads a downwardly inclined runway D delivering to a transfer means E, all subtended by suitable drainage pans and by a runway R leading from the delivery end of means E to a point adjacent the receiving end of means A, said parts being, in general, like similar parts in my previously mentioned patents but differing in important details which will be described.

Adjacent the receiving end of the transfer means A is a decrating means G which contributes materially to speed up the operation of the apparatus considered as a whole and forms the subject matter of companion application Serial No. 542,586.

The transfer mechanism A comprises a reception table 50 upon which an egg-filled filler F and subjacent mat M is transferred from the decrating means by the operator at Y and this table is at the receiving end of the inclined runway B. Pivoted at 51 on standards 52 is a transfer pan 53 comprising a bottom wall 54, a side wall 55 alongside the entire length of one side edge of bottom 54, an opposed side wall 56 extending part of the length of the other side edge of bottom 54 and provided at its free edge with an outturned lip 56', an end wall 57 extending between side walls 55 and 56 and perforated at 57', and a top wall 58 extending from end wall 57 a distance no more than half the length of a filler, the arrangement being such that the free edge of bottom 54 may be brought into alignment with the plane of receiving table 50.

The distance between bottom 54 and top wall 58 is slightly greater than the combined thickness of a mat M, a filler F, and a metallic cellular tray T commonly used in machines of this type, so that an egg-filled filler and subjacent mat having been deposited on table 50 and tray T imposed on the filler, the group may be slid into the transfer pan into contact with end wall 57, as shown in Fig. 3.

In order to automatically eject the inverted group from the transfer pan, I provide the pusher P pivoted at 60 adjacent the delivery edge of table 50. Pusher P comprises two spring arms

61 and 62 and normally lies, by gravity, in the position shown in Fig. 3. The rear wall 57 of the transfer pan is perforated at 57' to permit entry of arm 62 of pusher P, and subtending this perforation is finger 63, conveniently integral with top wall 58, the arrangement being such that, as the transfer pan is swung from the position shown in Fig. 3 to the position shown in Fig. 4, the bottom rear edge of the transfer pan will first engage arm 61 to swing pusher P upwardly flexing arm 61 (dotted lines Fig. 3a) and bringing arm 62 into the path of movement of finger 63 which, coming up under the curved tip of arm 62, brings said arm in register with perforation 57' whereupon the flexed arm 61 flips arm 62 against the mat-filler-tray group so as to shove the group forwardly enough to overbalance forwardly over the free edge of top wall 58 and start, by gravity, on its way down runway B, all as illustrated diagrammatically in Figs. 3, 3a, and 4.

To automatically return the transfer pan to receiving position, I provide the leaf spring 65 held by clamp 66 so that its free end will be engaged by ledge 67 as the pan reaches its delivery position (Fig. 4), said ledge coming into engagement with an adjustable stop 68 to limit inverting movement of the pan.

The runway B comprises two parallel series of rollers 70 upon which the successive groups of egg-filled trays and imposed fillers and mats ride, under the influence of gravity, until the foremost group comes into contact with stopping means, preferably controlled by the immersing means C.

Inversion of egg groups cause the eggs—or most of them—to drop in the filler into the cellular tray T but sometimes one or more of the eggs may hang in the filler or the filler may hang on the eggs which have been transferred to the tray. In order to insure freedom of the fillers, I provide, along runway B, filler tilting or lifting means preferably arranged to act first on one side of the filler and then on the other. This filler tilting means is illustrated in detail in Figs. 6 to 8.

Attached to each side of runway B is a bracket 71 provided with a pin 72 inclined slightly from horizontal, as shown in Fig. 6. Pivoted on pin 72 is a lever 73 the free end of which is provided with an inturned lip 74 which overlies a roller 75 carried by a two-part arm 76 carried by a rockshaft 77 journaled in a side wall of the runway and provided with an operating arm 78. The two parts of arm 76 may be adjusted by the bolt and slot connection 79 to vary the effect of roller 75 on lever 73. Pivoted at its middle, at 80, on lever 73, is a lifter bar 81 provided at its upper edge with an inturned lip 82 arranged, as shown in Fig. 6, to be overridden by the fillers F as they pass along runway B. Arms 76 are intermittently actuated and appropriate means for this purpose consists of a link 83 connected to arm 78 and to a lever 84 pivoted at 85 adjacent the inverter and provided with a roller 86 arranged to be engaged by a cam 87 carried by the transfer pan so that each filler tilter is raised twice for each complete oscillation of the transfer pan.

Bar 81 being medially pivoted on lever 73 will always evenly engage throughout its length with the overriding fillers so that, as lever 73 rises, the filler will be evenly tilted about its opposite side and, as lever 73 descends, will be returned over the eggs in the subjacent tray T. Levers 73 are actuated while the trays are in runway B and stationary, and maintenance of an even contact of bar 81 with the overriding filler at this time contributes materially to proper maintenance of the filler in registry over the eggs. I have found it especially desirable that the filler lifting means at opposite sides of the runway be spaced longitudinally of the runway approximately equal to the length of a tray, or multiple thereof, in order that the fillers will be tilted from side to side, rather than raised vertically, thus assuring that the fillers will be freed from the eggs before arrival at the immersion station.

In order to insure proper position of flange 82 of lifter bar 81, I provide the vertically adjustable stop 88 underlying flange 82 near its forward end so that, as lever 73 swings downwardly, the forward end of flange 82 will contact the stop 88 and bar 81 be brought to the position shown in Fig. 7 where its flange 82 will be properly aligned to be overridden by an oncoming filler F.

It will be noted from Fig. 3 that trunnions 51 lie considerably closer to the back end of pan 55 than they do to the receiving end of said pan. When the operator has charged the pan with an egg-filled filler F and imposed tray T, he turns the pan counter-clockwise to a point where it will be overbalanced toward the left (Fig. 3), whereupon he may discontinue turning effort while the overbalanced tray continues on its counter-clockwise swing, the descent being cushioned by contact of ledge 67 with the free end of leaf spring 65, pusher P, at the end of this movement, acting to eject the egg-filled filler and subjacent tray onto the downwardly inclined runway B and, as the rear end of the tray T leaves the then forward edge of bottom 58, spring 65 serves to turn pan 55 clockwise to a point where it is then overbalanced toward the right when it will continue its descent by gravity to the receiving position shown in Fig. 3. It will be noted that the attention of the operator to this mechanism is required only until he has brought pan 55 to the overbalanced position in the counter-clockwise direction (indicated in dotted lines in Fig. 3), so that, during the rest of the above-described operation, he may be engaged in obtaining another egg-filled filler and tray for injection into the pan when it has returned to normal receiving position.

I claim as my invention:

1. The combination with egg-group transfer means comprising an invertible pan pivoted medially on a horizontal axis and dimensioned to receive a planar group of eggs, associate filler and an imposed cellular tray, of a pusher arranged adjacent said pan and having a portion projectible into ejecting engagement with such group, and means integrated with said pan to engage and actuate said pusher upon inversion of the pan, to project said pusher portion against such group and eject it from the inverted pan.

2. The combination with egg-group transfer means comprising an invertible pan pivoted medially on a horizontal axis and dimensioned to receive a planar group of eggs, associate filler and an imposed cellular tray, of a pusher pivoted on a horizontal axis adjacent said pan and comprising two divergent arms so arranged as to be successively engaged by elements movable with the pan whereby, upon inversion of the pan, one arm of said pusher will be projected into engagement with the pan content to eject said content from the pan.

3. Apparatus as described in claim 2 wherein the initially engaged arm of the pusher is spring flexed by action of pan inversion to spring urge the other pusher arm into engagement of the pan content.

4. Egg transfer means comprising an invertible pan pivoted medially on a horizontal axis and dimensioned to receive a planar group of eggs, associate filler and cellular tray, a normally unstressed leaf spring arranged with its free end alongside said tray with its free end engageable by a portion of the pan near the end of its inversion movement, whereby, upon release of the pan, the spring will automatically revert the pan.

5. In an egg treating machine, a tray runway, a transfer pan dimensioned to receive a planar group of eggs, a filler and tray thereof arranged at the receiving end of said runway and movable from a receiving position to a discharge position relative to said runway, a filler-lifter arranged alongside said runway at a point spaced from the transfer pan and in position to be overrun by successive fillers, and means actuated by movement of said transfer pan for intermittently vertically reciprocating said filler-lifter.

6. Apparatus of the character specified in claim 5 and including a second filler-lifter and reciprocating means therefor on the side of the runway opposite that flanked by the first lifter and spaced along the runway from the first lifter.

7. In an egg treating machine, a runway adapted to receive a series of trays carrying a planar group of eggs and imposed fillers, a filler-lifter arranged alongside said runway and comprising a lever, and a substantially horizontal lifter bar pivoted medially on said lever and having a ledge arranged to be overridden by successive fillers as they pass along the runway, and means for intermittently actuating said lever to lift one side of an overriding filler.

8. Apparatus of the character specified in claim 7 and including a stop underlying the forward end of the lifter bar to be engaged by said lifter bar in its lowest position to reversely swing said bar on its lever.

9. In an egg treating machine, a pan internally dimensioned to receive an egg-filled filler and accompanying tray, a transverse horizontal axis so spaced in the length of the pan that the receiving end thereof will overbalance the opposite end, and a normally unstressed spring arranged to come into action only after the tray has been swung from receiving position to cushion the final discharge movement of the pan and to return the empty pan past dead center on its way to receiving position.

10. In an egg treating machine, a pan internally dimensioned to receive an egg-filled filler and accompanying tray, a transverse horizontal axis so spaced in the length of the pan that the receiving end thereof will overbalance the opposite end, a normally unstressed spring arranged to come into action after the tray has been swung from receiving position to cushion the final discharge movement of the pan and to return the empty pan past dead center on its way to receiving position, and ejector means actuated by the pan for ejecting the pan contained egg group and associate tray when the pan reaches discharge position.

11. In an egg treating machine, a pan internally dimensioned to receive an egg-filled filler and associate tray, a support for said pan comprising a transverse horizontal axis so spaced in the length of the pan that the receiving end thereof will overbalance the opposite end, a normally unstressed leaf spring anchored adjacent said pan with its free end alongside said pan, and an element carried by said pan in position to engage said leaf spring and flex the same after the receiving end of the pan has passed dead center toward discharge position, the arrangement being such that the egg-filled pan will continue under gravity to discharge position against the opposition of said spring and said spring will act upon the empty pan to carry it past dead center toward receiving position.

WILLIS G. HOWARD.

REFERENCES CITED

The following references are of record in the file of this patent:

UNITED STATES PATENTS

| Number | Name | Date |
|---|---|---|
| 1,783,814 | Schroaeder et al. | Dec. 2, 1930 |
| 1,814,680 | Ford | July 14, 1931 |
| 1,960,339 | Howard | May 29, 1934 |
| 1,075,640 | Foster | Oct. 14, 1913 |
| 1,622,493 | Craig | Mar. 29, 1927 |
| 1,677,290 | Parker | July 17, 1928 |